(12) United States Patent
Varghese

(10) Patent No.: US 9,163,729 B2
(45) Date of Patent: Oct. 20, 2015

(54) BACKUP BULLET SEAL WITH ACTUATION DELAY FEATURE

(71) Applicant: Baker Hughes Incorporated, Houston, TX (US)

(72) Inventor: Sibu Varghese, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 74 days.

(21) Appl. No.: 13/749,344

(22) Filed: Jan. 24, 2013

(65) Prior Publication Data

US 2014/0203512 A1 Jul. 24, 2014

(51) Int. Cl.
*F16J 15/18* (2006.01)
*F16J 15/16* (2006.01)
*F16J 15/32* (2006.01)

(52) U.S. Cl.
CPC ............ *F16J 15/164* (2013.01); *F16J 15/3236* (2013.01)

(58) Field of Classification Search
CPC ....... F16J 15/164; F16J 15/32; F16J 15/3232; F16J 15/3236
USPC .......................... 277/336, 337, 338, 339, 342
See application file for complete search history.

(56) References Cited

U.S. PATENT DOCUMENTS

| | | | |
|---|---|---|---|
| 4,398,731 A * | 8/1983 | Gorman et al. ............... | 277/529 |
| 4,527,806 A * | 7/1985 | Ungchusri et al. ............ | 277/530 |
| 4,811,959 A | 3/1989 | Bullard et al. | |
| 5,109,926 A * | 5/1992 | Mody et al. ................... | 166/187 |
| 5,524,905 A | 6/1996 | Thoman et al. | |
| 5,611,547 A | 3/1997 | Baugh et al. | |
| 5,879,010 A | 3/1999 | Nilkanth et al. | |
| 6,203,020 B1 | 3/2001 | Mireles, Jr. et al. | |
| 6,318,729 B1 | 11/2001 | Pitts, Jr. et al. | |
| 7,191,843 B2 * | 3/2007 | Wong ............................ | 166/386 |
| 7,341,258 B2 | 3/2008 | Holt et al. | |
| 7,363,981 B2 | 4/2008 | Coon et al. | |
| 7,401,788 B2 | 7/2008 | Williams et al. | |
| 7,472,756 B2 * | 1/2009 | Wong ............................ | 166/386 |
| 7,819,184 B2 | 10/2010 | Sachdeva et al. | |
| 2008/0029264 A1 | 2/2008 | Williams et al. | |

* cited by examiner

*Primary Examiner* — Gilbert Lee
(74) *Attorney, Agent, or Firm* — Steve Rosenblatt

(57) ABSTRACT

A sealing system features a primary and secondary bullet seals where the secondary seal is preferably bidirectional and is activated to spread fins with a t-shaped ring that is driven with differential pressure to advance after temperature exposure softens a stop material on the extending portion of the t-shaped ring. Opposed t-shaped rings are disposed at ends of the backup ring that have fins at both ends. Advancement of the t-shaped ring spreads the fins and retains them in the spread condition for enhanced sealing. Optionally the primary seal can also be actuated with a similar t-shaped ring with a temperature sensitive delay feature.

18 Claims, 3 Drawing Sheets

BACKUP BULLET SEAL WITH ACTUATION DELAY FEATURE

FIELD OF THE INVENTION

The field of the invention is high pressure and high temperature seals and more particularly sealing arrangements with backup feature and more particularly a backup that has a delay feature to energize.

BACKGROUND OF THE INVENTION

Bullet seals are described in detail in U.S. Pat. No. 5,611,547 where seals 80 and 82 are disposed in mirror image with an o-ring 78 between them to handle pressure differential in opposed directions. These seals have a generally pointed end and an opposite finned end adjacent the o-ring. These seals were designed to replace the stacks of chevron shaped seals shown in FIG. 1 of that patent. There were no backup seals used for pressure differentials in a given direction and no efforts to actuate the finned end beyond the axial pressure from fluids in the string. Other related seal designs are shown in U.S. Pat Nos. 5,879,010; 7,341,258; 5,524,905; 7,363,981; 6,318,729; 7,819,184 and 7,401,788.

Of the bullet seals that have been deployed in the past there have been issues with reliable performance particularly where significant temperature fluctuations of over 200 degrees F. could occur. These seal assemblies had no backup as illustrated in FIG. 1 with opposed bullet seals 10 and 12 separated by an o-ring 14 and disposed in a mirror image layout for opposing pressure differentials from either an uphole or a downhole direction. The past design focused on ease of assembly and a need to optimize a sealing system in a small confined space. The bullets were installed in an activated configuration. In some applications backup bullet seal pairs were used where the primary and the backup seals were identically configured and installed in a configuration that application of a net differential pressure in one direction activated both the primary and secondary seals due to axial compression through the o-ring in between opposed seal pairs and more rigid end rings adjacent the tapered ends of the seals.

What is needed and provided by the present invention is an assembly of bullet seals with a backup that is delayed in being deployed using primarily a temperature effect on a material that prevents advancement of a ring between end fins. The backup seal is not actuated until pressure is communicated to it such as by a failure of a primary seal and then there is the effect of temperature of well fluids to allow the t-shaped ring to advance as the material on the leading branch of the t-shaped ring softens to allow pressure differential to advance the ring and spread the end fins of the bullet seal to enhance its performance. These and other features of the present invention will be more readily understood by those skilled in the art from a review of the detailed description of the invention and the associated drawings while recognizing that the full scope of the invention will be determined by the appended claims.

SUMMARY OF THE INVENTION

A sealing system features a primary and secondary bullet seals where the secondary seal is preferably bidirectional and is activated to spread fins with a t-shaped ring that is driven with differential pressure to advance after temperature exposure softens a stop material on the extending portion of the t-shaped ring. Opposed t-shaped rings are disposed at ends of the backup ring that have fins at both ends. Advancement of the t-shaped ring spreads the fins and retains them in the spread condition for enhanced sealing. Optionally the primary seal can also be actuated with a similar t-shaped ring with a temperature sensitive delay feature.

DETAILED DESCRIPTION OF THE PREFERRED EMBODIMENT

Figure 2:
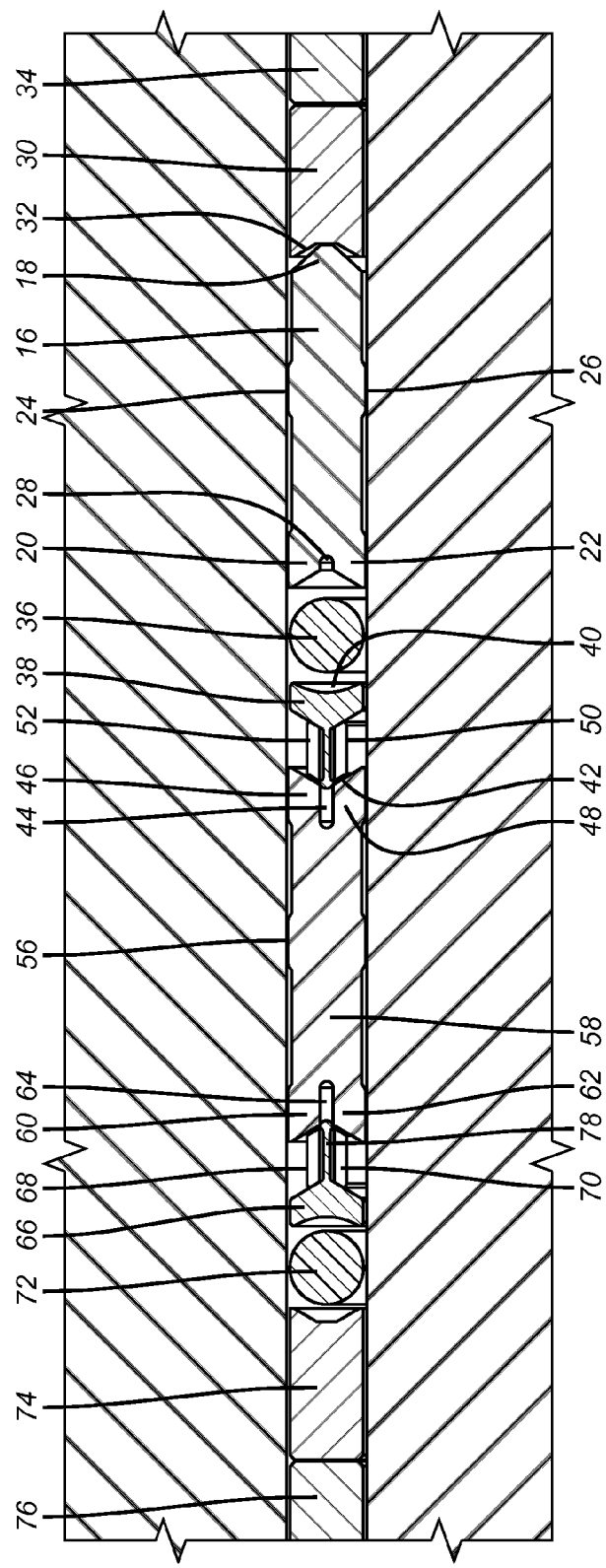
FIG. 2 shows a primary seal used in conjunction with a bidirectional bullet seal as backup when the backup seal is not activated.

FIG. 2 illustrates a primary bullet seal 16 that has a tapered nose 18 and opposed fins 20 and 22 respectively on the outside diameter and the inside diameter. There are outside and inside sealing areas 24 and 26 respectively. A circular groove 28 divides the fins 20 and 22. A leading end ring 30 has a taper 32 to accept the tapered nose 18. This ring is typically plastic that has the needed properties of compressive strength and tolerance to well fluids and anticipated temperature. The material can be PEEK for example. Another ring 34 that is typically metal is disposed ahead of ring 30 for backup. On the other end of the primary bullet seal 16 is an o-ring 36.

Adjacent o-ring 36 is t-shaped ring 38 that has a concave curved end 40 that contacts o-ring 36 and a branch component 42 that is formed to fit into groove 44 that is disposed between outside and inside fins 46 and 48 respectively. However, internal and external rings 50 and 52 are disposed on opposed sides of the branch component 42 with the purpose of keeping the branch component 42 out of groove 44 until rings 50 and 52 respond to thermal or other inputs and soften or weaken or collapse or dissolve or otherwise get out of the way so that a net force applied from the downhole side represented by arrow 54 in FIG. 3 allows the branch component 42 to advance into groove 44. That advancing spreads the fins 46 and 48 by about 10-15 thousands beyond the dimension at 56, in a laterally unrestrained condition.

At the opposite end of bidirectional backup seal 58 there are mirror image fins 60 and 62 to fins 46 and 48. Fins 60 and 62 are separated by groove 64 with a similar arrangement using t-shaped ring 66 with rings 68 and 70 as previously described for the other end of the backup seal 58. Adjacent to the t-shaped ring 66 is o-ring 72 which is followed by plastic ring 74 made of PEEK or other material suitable for the load, chemical exposure and thermal conditions downhole. Finally another support ring 76 that is generally metallic follows adjacent ring 74.

Loading comes primarily from downhole represented by arrow 54. That pressure compresses the assembly shown in FIG. 2. Normally the sealing function is carried out by the primary seal 16 with force transferred to o-ring 36 and into t-shaped ring 38 and then through rings 50 and 52 into the backup seal 58 and through the mirror image rings 68 and 70 to t-shaped ring 66 and onto o-ring 72 and ultimately against rings 74 and 76 that are backstopped by a fixed support that is not shown. With the primary ring 16 functional against pressure from downhole the well fluids and their temperature will not reach rings 50, 52, 68 and 70 and they will retain their structural rigidity. However, if there is a failure of the seal 16 the fluids from downhole will reach these rings and cause them to weaken so that they no longer impede the relative movement with respect to seal 58 and the branch components 42 and 78 can respectively then enter grooves 44 and 64 to apply a radial sealing force to the respective pair of fins that define the grooves 44 and 64 to enhance the effectiveness of the backup seal 58 to pressure differential in opposed directions. This position is shown in FIG. 3.

Figure 3:
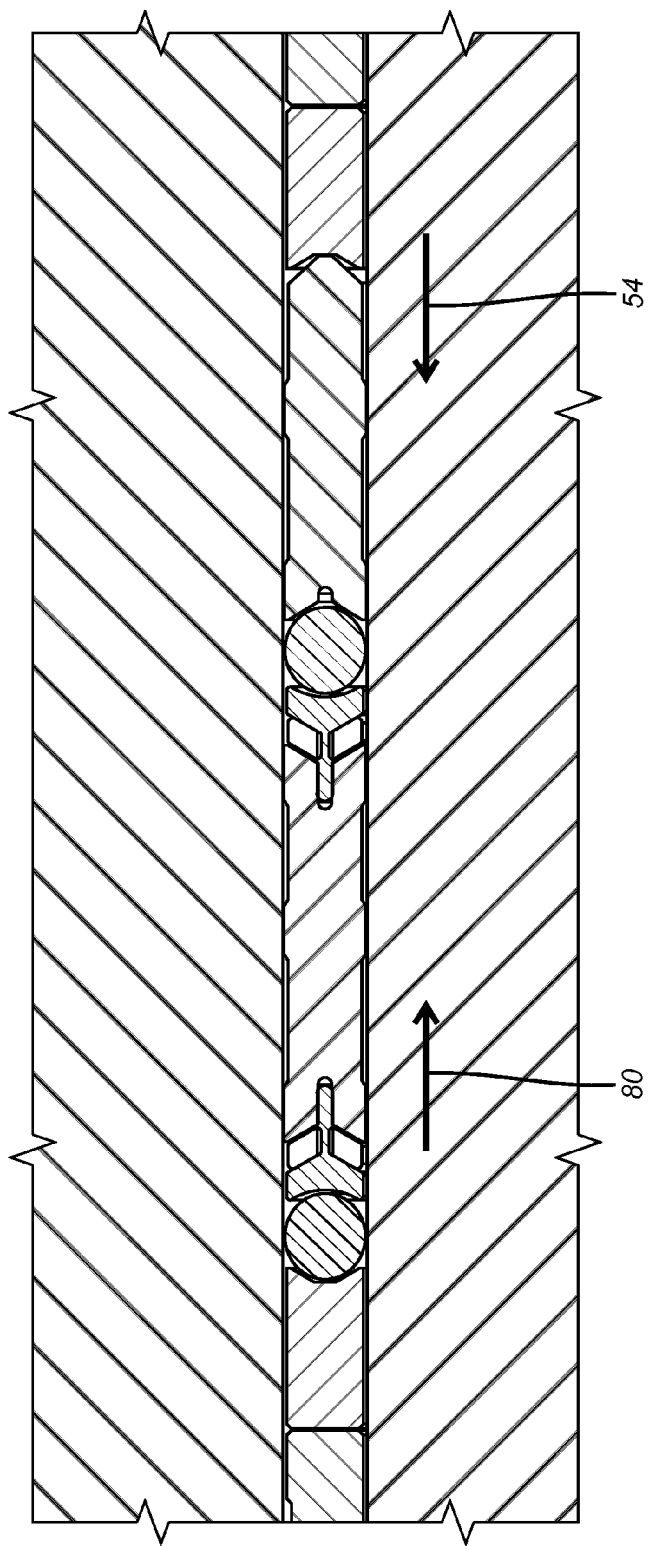
FIG. 3 is the view of FIG. 2 with the backup bullet seal activated by enabled advancement of the t-shaped rings into the space between the fins.

Those skilled in the art will appreciate that there are variations contemplated on the illustrated assembly in FIGS. 2 and 3. For example a mirror image of the entire assembly can be located further uphole above ring 76 and can function in a similar way to retain differentials pressures from uphole in the direction of arrow 80. Alternatively, the entire assembly can be as depicted in FIGS. 2 and 3. The primary seal 16 can be outfitted with its own t-shaped ring similarly shaped as ring 38 with thermally responsive rings 50 and 52 but with a branch component such as 42 oriented toward groove 28 for selective entry therein when the right conditions of compressive force and predetermined temperature are reached. Such a ring would be located between o-ring 36 and fins 20 and 22.

The dimensions of the seals 16 and 58 at outer locations 24 and 56 are preferably the same. Rings such as 50 or 52 can be a rubber or elastomer or a polymer such as shape memory polymer.

Those skilled in the art will appreciate that the delay feature provided by rings such as 50 and 52 will facilitate assembly since there will be negligible resistance to installation during the assembly process with a reduced chance for distortion or twisting in the bullet seals that make up the sealing assembly. Premature activation can impede the installation effort and can cause damage such as tears or cracks that can compromise the seal in high temperature applications with conditions reaching to 350 degrees F. or more and pressures in thousands of pounds. The driving into a groove of a branch component such as 42 is a more assured way for enhancing sealing force that pushing an o-ring against fins because the nature of the displacement that is obtained is more certain whereas the o-ring can distort in a variety of ways that will not necessarily deliver the desired fin movement or will not retain the initial displacement in a manner that filling the groove with the branch component that in essence widens the groove as the component is advanced and stays put thereafter to enhance the sealing in the region of the fins. The backup seal 58 winds up only fully actuated at a later time than the initial assembly and likely well after deployment upon exposure to predetermined compressive force and temperature of well fluids.

Figure 1:
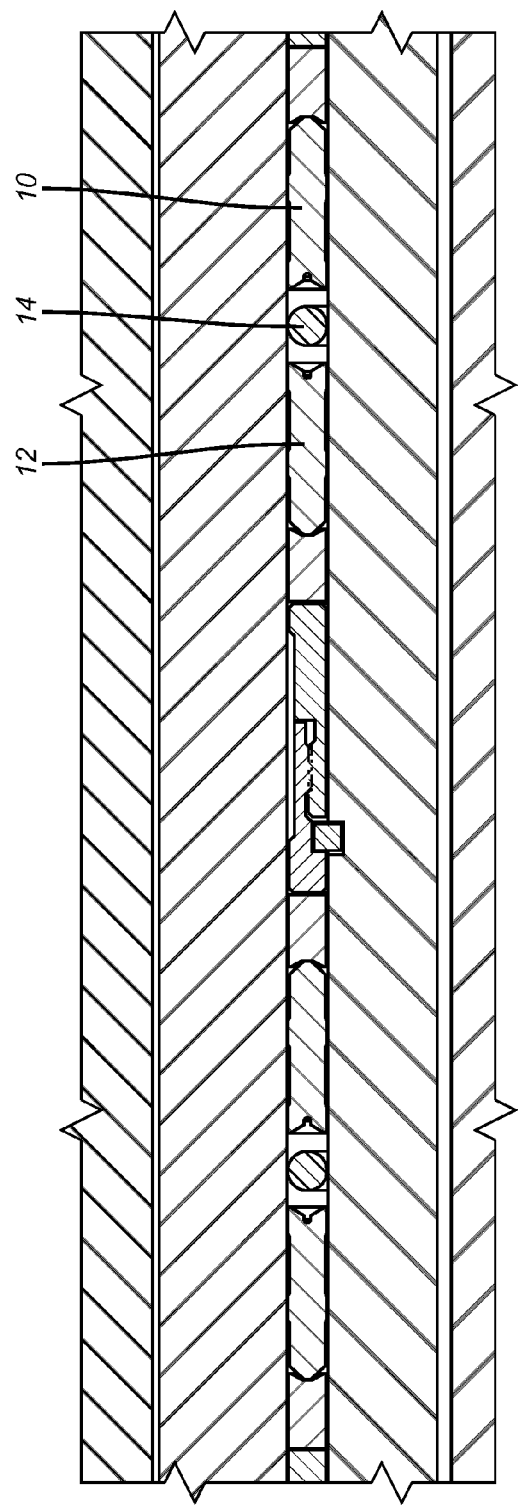
FIG. 1 is a prior art installation of opposed bullet seals located on opposed sides of a fixed support location.

One condition that can make a primary seal 16 fail can be dramatic temperature changes with associated dimensional changes that can be experienced as different procedures are undertaken such as cycles of steam injection and downtime. In such circumstances with differentials in temperature of over 200 degrees F. that may make a primary seal fail to hold pressure, the actuation of the secondary bidirectional seal 58 can prevent a leakage situation. Seal 58 can also be optionally unidirectional and optionally more than a single seal 58 can be used in a configuration to prevent leakage in a given direction apart from the option of a full mirror image layout for the assembly shown in FIGS. 1 and 2.

The above description is illustrative of the preferred embodiment and many modifications may be made by those skilled in the art without departing from the invention whose scope is to be determined from the literal and equivalent scope of the claims below:

I claim:

1. A seal assembly for a subterranean tool having a bullet shaped cross-section for an annular space having an uphole and a downhole end for subterranean use, comprising: opposed fins on at least one end of at least one seal body that are spaced apart to define a groove therebetween;
at least one ring having an extending branch positioned in alignment with and initially substantially out of said groove upon assembly to the subterranean tool; and
at least one selective travel stop located outside said groove to prevent movement of said extending branch into said groove upon installation of the seal assembly into the subterranean tool, said travel stop being defeated while remaining outside said groove at a subterranean location for the subterranean tool for movement of said extending branch into said groove to deliver a sealing force to said fins at the subterranean location.

2. The assembly of claim 1, wherein:
said travel stop comprises a material whose compressive strength decreases on exposure to thermal stress.

3. The assembly of claim 1, wherein:
said travel stop comprises rings disposed on opposed sides of said extending branch.

4. The assembly of claim 3, wherein:
said rings are made of an elastomer or a polymer.

5. The assembly of claim 1, wherein:
said travel stop collapses at the subterranean location under a predetermined compressive force and under the influence of thermal loads at the subterranean location.

6. The assembly of claim 1, wherein:
said at least one seal body comprises opposed fins at both ends thereof;
said at least one ring comprises a plurality of rings;
said at least one travel stop comprising a plurality of travel stops
said rings disposed in mirror image with extending branches and associated travel stops positioned in alignment with and initially substantially out of respective grooves on opposed ends of said seal body.

7. The assembly of claim 6, further comprising:
at least one o-ring adjacent a conforming end shape of an associated said ring.

8. The assembly of claim 7, wherein:
said extending branch is wider than said groove before entry in the range of at least 10 thousandths of an inch.

9. The assembly of claim 8, wherein:
said travel stop comprises a material whose compressive strength decreases on exposure to thermal stress.

10. The assembly of claim 9, wherein:
said travel stop comprises rings disposed on opposed sides of said extending branch.

11. The assembly of claim 10, wherein:
said rings are made of an elastomer or a polymer.

12. The assembly of claim 11, wherein:
said travel stop collapses at the subterranean location under a predetermined compressive force and under the influence of thermal loads at the subterranean location.

13. The assembly of claim 12, wherein:
said at least one seal body comprises multiple seal bodies further comprising a primary seal body having opposed fins on one end thereof and a tapered opposed end and a secondary seal body having opposed fins on opposed ends thereof;
said at least one o-ring comprising a plurality of o-rings disposed on opposed sides of said secondary seal body and in contact with an associated said ring.

14. The assembly of claim 13, wherein:
said extending branch of each said ring enters a respective groove in said secondary seal subsequent to initial assembly upon thermal loading of said travel stops resulting from failure of said primary seal.

15. The assembly of claim 14, wherein:

said primary seal further comprises an associated said ring and said travel stop with an extending branch substantially aligned and initially positioned substantially outside said associated groove.

16. The assembly of claim 1, wherein:

said travel stop fails in compression at a predetermined force.

17. The assembly of claim 1, wherein:

said travel stop axially collapses under compressive loading upon exposure to well fluid or thermal stress from well fluid.

18. The assembly of claim 1, wherein:

said travel stop dissolves upon selective exposure to well fluids.

\* \* \* \* \*